(12) United States Patent
Kim et al.

(10) Patent No.: US 8,279,340 B2
(45) Date of Patent: Oct. 2, 2012

(54) IMAGE SIGNAL PROCESSING APPARATUS AND METHOD THEREOF

(75) Inventors: Shin-haeng Kim, Yongin-si (KR); Yeong-taeg Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 867 days.

(21) Appl. No.: 12/388,747

(22) Filed: Feb. 19, 2009

(65) Prior Publication Data

US 2010/0026891 A1 Feb. 4, 2010

(30) Foreign Application Priority Data

Jul. 30, 2008 (KR) .................. 10-2008-0074800

(51) Int. Cl.
*H04N 7/01* (2006.01)
*G06K 9/36* (2006.01)

(52) U.S. Cl. ......... 348/441; 348/452; 348/459; 382/236

(58) Field of Classification Search .................. None
See application file for complete search history.

(56) References Cited

U.S. PATENT DOCUMENTS

| | | | |
|---|---|---|---|
| 2005/0243202 A1* | 11/2005 | Grundmeyer et al. | 348/441 |
| 2009/0208123 A1* | 8/2009 | Doswald | 382/236 |
| 2010/0013988 A1* | 1/2010 | Hulyalkar et al. | 348/441 |
| 2010/0118185 A1* | 5/2010 | Furukawa et al. | 348/452 |

* cited by examiner

*Primary Examiner* — Jeffrey Harold
*Assistant Examiner* — Sean Haiem
(74) *Attorney, Agent, or Firm* — Sughrue Mion, PLLC

(57) ABSTRACT

An image signal processing unit and an image signal processing method thereof. An image signal processing unit estimates motion characteristics of an input image, and adjusts a phase of an interpolation frame according to the motion characteristics when converting a frame rate. Accordingly, linearity can be maintained according to the motion characteristics of an input image, and the frame rate can be converted without generating noise such as halo artifacts.

14 Claims, 5 Drawing Sheets

IMAGE SIGNAL PROCESSING APPARATUS AND METHOD THEREOF

CROSS-REFERENCE TO RELATED APPLICATIONS

This application claims priority from Korean Patent Application No. 10-2008-0074800, filed on Jul. 30, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to image signal processing, and more particularly, to image signal processing to convert and output a frame rate of an input image signal.

2. Description of the Related Art

Image signal processing apparatuses convert input image signals into signals which can be displayed on display apparatuses. If a frame rate of an input image signal is different from a frame rate supported by a display apparatus, the frame rate of the input image signal is converted into the frame rate supported by the display apparatus.

For example, since European display apparatuses have a frame rate of 50 Hz but U.S. display apparatuses have a frame rate of 60 Hz, in order to display U.S. image signals on European display apparatuses, the frame rate must be converted, and likewise in order to display European image signals on U.S. display apparatuses, the frame rate must be converted. In liquid crystal displays (LCDs), 60 Hz may be converted into 120 Hz so as to prevent generation of noise such as motion blur.

When converting the frame rate, noise such as halo artifacts may appear on a screen. In order to remove halo artifacts, diverse algorithms are applied to image signal processing apparatuses. Therefore, there is a need for methods for removing noise such as halo artifacts.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

An aspect of the present invention provides an image signal processing apparatus to convert the frame rate of input image signals so as not to produce noise such as artifacts, and an image signal processing method thereof According to an exemplary aspect of the present invention, there is provided an image signal processing apparatus including an input image analysis unit which estimates motion of an input image and outputs the motion characteristics, a comparison unit which compares the motion characteristics with preset reference values, and a control unit which changes a phase of an interpolation frame according to the result of the comparison by the comparison unit.

The input image analysis unit may include a motion estimation unit which estimates motion between a previous frame and a current frame, which are included in the input image, and outputs motion vectors, a representative value calculation unit which calculates a motion vector which occupies the largest portion from among the motion vectors output by the motion estimation unit as a representative value, and a changed area extraction unit which extracts a changed area between the previous frame and the current frame based on the motion estimated by the motion estimation unit.

The control unit may change the phase of the interpolation frame to be closer to a phase of one of the previous frame and the current frame if the result of comparison output by the comparison unit is that one of the representative value and the changed area is larger than the preset reference value.

The control unit may not change the phase of the interpolation frame if the result of comparison output by the comparison unit is that the representative value and the changed area are both smaller than the preset reference values.

The comparison unit may compare one of the representative value and the changed area with the preset reference value and output the comparison result as a factor to adjust the phase of the interpolation frame.

The control unit may control the phase of the interpolation frame to change between a phase of the previous frame and a phase of the current frame, according to the factor output by the comparison unit.

The changed area extraction unit may extract a covered area, which is displayed in the previous frame but is not displayed in the current frame, and an uncovered area, which is not displayed in the previous frame but is displayed in the current frame, as the changed area.

The image signal processing apparatus may further include an interpolation frame generation unit which generates the interpolation frame according to the control of the control unit.

According to another exemplary aspect of the present invention, there is provided an image signal processing method including estimating motion of an input image and outputting the motion characteristics, comparing the motion characteristics with preset reference values, and changing a phase of an interpolation frame according to the result of comparison by the comparison unit.

The operation of outputting the motion characteristics may include estimating motion between a previous frame and a current frame, which are included in the input image, and outputting motion vectors, calculating a motion vector which occupies the largest portion from among the output motion vectors as a representative value, and extracting a changed area between the previous frame and the current frame based on the motion estimation result.

In the operation of changing the phase of the interpolation frame, the phase of the interpolation frame may change to be closer to a phase of one of the previous frame and the current frame if the output result of comparison is that one of the representative value and the changed area is larger than the preset reference value is output.

In the operation of changing the phase of the interpolation frame, the phase of the interpolation frame may not change if the output result of comparison is that the representative value and the changed area are both smaller than the preset reference values.

In the operation of comparing the motion characteristics with the preset reference values, the result of comparing one of the representative value and the changed area with the preset reference value may be output as a factor to adjust the phase of the interpolation frame.

In the operation of changing the phase of the interpolation frame, the phase of the interpolation frame may be controlled to change between a phase of the previous frame and a phase of the current frame, according to the output factor.

In the operation of extracting the changed area, a covered area, which is displayed in the previous frame but is not displayed in the current frame, and an uncovered area, which is not displayed in the previous frame but is displayed in the current frame, may be extracted as the changed area.

The image signal processing method may further include generating the interpolation frame.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
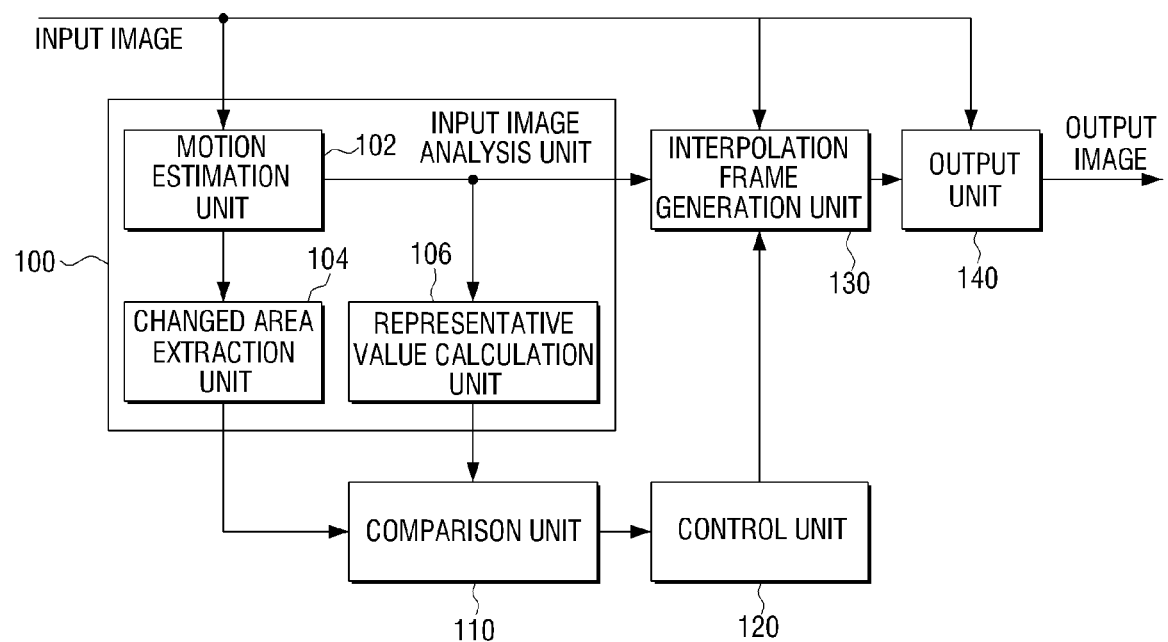
FIG. 1 is a schematic block diagram illustrating a configuration of an image signal processing apparatus according to an exemplary embodiment of the present invention.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

Figure 2:
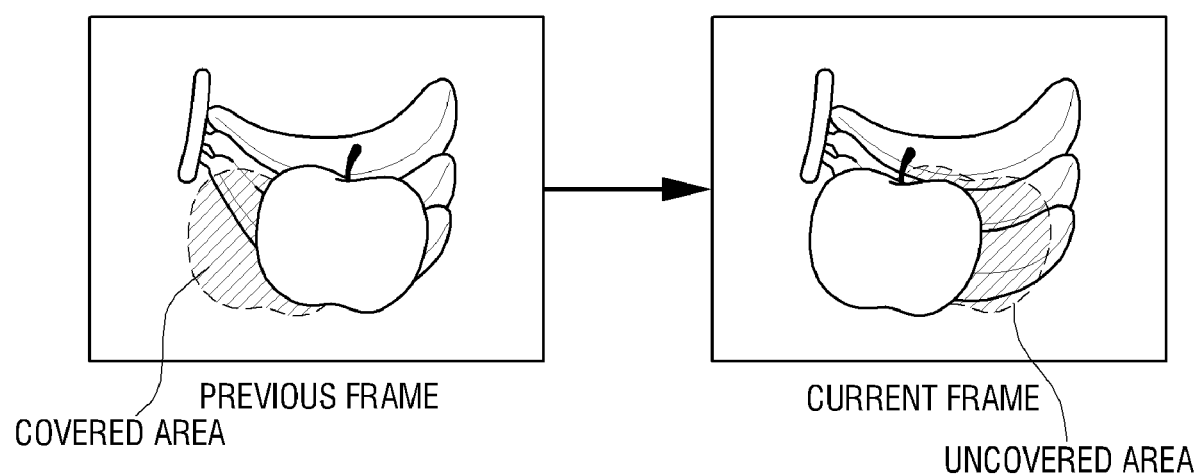
FIG. 2 is a drawing illustrating a method for extracting a changed area using an image signal processing apparatus according to an exemplary embodiment of the present invention.
Figure 3:
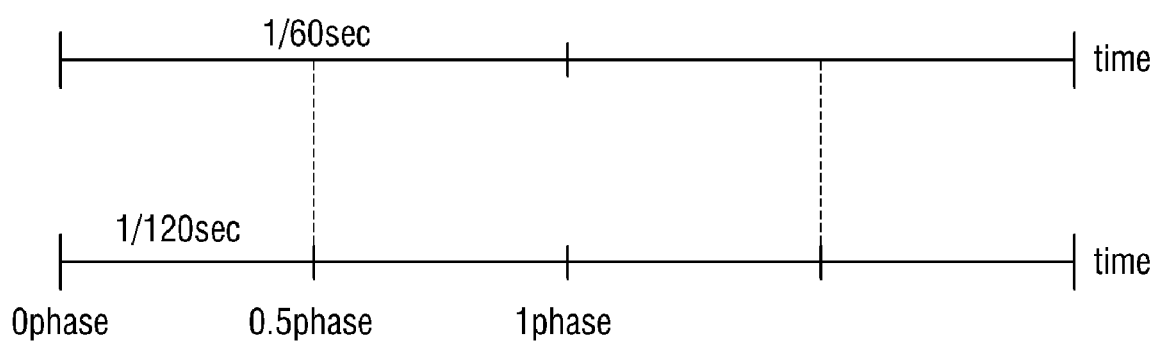
FIG. 3 is a drawing illustrating a phase change range of an image signal processing apparatus according to an exemplary embodiment of the present invention.

FIG. 1 is a schematic block diagram illustrating a configuration of an image signal processing apparatus according to an exemplary embodiment of the present invention. FIG. 2 is a drawing illustrating a method for extracting a changed area using an image signal processing apparatus according to an exemplary embodiment of the present invention. FIG. 3 is a drawing illustrating a phase change range of an image signal processing apparatus according to an exemplary embodiment of the present invention.

Referring to FIG. 1, the image signal processing apparatus may include an input image analysis unit 100, a comparison unit 110, a control unit 120, an interpolation frame generation unit 130, and an output unit 140.

The input image analysis unit 100 analyzes the characteristics of an input image, and may include a motion estimation unit 102, a changed area extraction unit 104, and a representative value calculation unit 106.

The motion estimation unit 102 estimates motion between a previous frame and a current frame of the input image, and outputs motion vectors. For example, the motion estimation unit 102 divides one frame into a plurality of blocks, estimates motion between a previous frame and a current frame of each block, and outputs a number of motion vectors corresponding to the number of blocks.

The changed area extraction unit 104 extracts changed areas between the previous frame and the current frame based on the results of motion estimation. That is, as illustrated in FIG. 2, the changed area extraction unit 104 extracts a covered area, which is displayed in the previous frame but is not displayed in the current frame, and an uncovered area, which is not displayed in the previous frame but is displayed in the current frame.

The representative value calculation unit 106 calculates a motion vector which occupies the largest portion from among the motion vectors output by the motion estimation unit 102 as a representative value. In FIG. 2, for example, the apple moves between the previous frame and the current frame. If a motion vector for an area within which the apple moves is "2" and a motion vector for an area excluding the area within which the apple moves is "0," the representative value is "0." That is, in a single frame, since the area excluding the area within which the apple moves occupies larger portion than the area within which the apple moves, the representative value is "0."

The interpolation frame generation unit 130 generates an interpolation frame between the previous frame and the current frame using the motion vectors output by the motion estimation unit 102. The interpolation frame generation unit 130 changes the phase of the interpolation frame by control of the control unit 120. The phase is a concept corresponding to a time at which a frame is displayed. Referring to FIG. 3, if the phase of the previous frame is 0 and the phase of the current frame is 1, the interpolation frame is displayed at 0.5.

The comparison unit 110 compares the motion characteristics output by the input image analysis unit 100 with preset reference values. That is, the comparison unit 110 compares the changed area output by the changed area extraction unit 104 and the representative value output by the representative value calculation unit 106 with preset reference values respectively, and outputs the result of comparison as a factor to change the phase of the interpolation frame.

For example, if the changed area output by the changed area extraction unit 104 is larger than a preset reference area, the comparison unit outputs a first factor to be capable of changing the phase of the interpolation frame to be closer to 0 or 1. Alternatively, if the representative value output by the representative value calculation unit 106 is larger than a preset reference representative value, the comparison unit 110 outputs a second factor to be capable of changing the phase of the interpolation frame to be closer to 0 or 1.

In the meantime, if the changed area output by the changed area extraction unit 104 is smaller than the preset reference area, and if the representative value output by the representative value calculation unit 106 is smaller than the preset reference representative value, the comparison unit 110 outputs a third factor to be capable of maintaining the phase of the interpolation frame at 0.5.

The control unit 120 controls the interpolation frame generation unit 130 to change the phase of the interpolation frame according to a factor output by the comparison unit 110. In greater detail, if the comparison unit 110 outputs the first factor or the second factor, the control unit 120 controls the interpolation frame generation unit 130 to make the phase of the interpolation frame closer to 0 or 1. Alternatively, if the comparison unit 110 outputs the third factor, the control unit 120 controls the interpolation frame generation unit 130 to maintain the phase of the interpolation frame at 0.5 as it is.

The control unit 120 may control the phase of the interpolation frame to change between the phase of the previous frame and the phase of the current frame according to the size of the first factor and the second factor. For example, if the size of the first factor is 3, the control unit 120 controls the phase of the interpolation frame to change to 0.35 or 0.65, and if the size of the first factor is 8, the control unit 120 controls the phase of the interpolation frame to change to 0.1 or 0.9. In the same manner, the phase of the interpolation frame can change according to the size of the second factor. In addition, it is also possible to change the phase of the interpolation frame according to the combined size of the first factor and the second factor.

As described above, noise such as halo artifacts appearing when converting a frame rate can be prevented by changing the phase of the interpolation frame according to the motion characteristics of the input image. In addition, in images having a low rate of halo artifacts, when converting a frame rate, linear features can be maintained.

As an example, in FIG. 1, in order to estimate motion, a single frame is divided into a plurality of blocks, but a method for estimating motion is not limited thereto. Furthermore, motion is estimated by frames, but it is also possible to analyze an input image by estimating motion by fields.

Figure 4A:
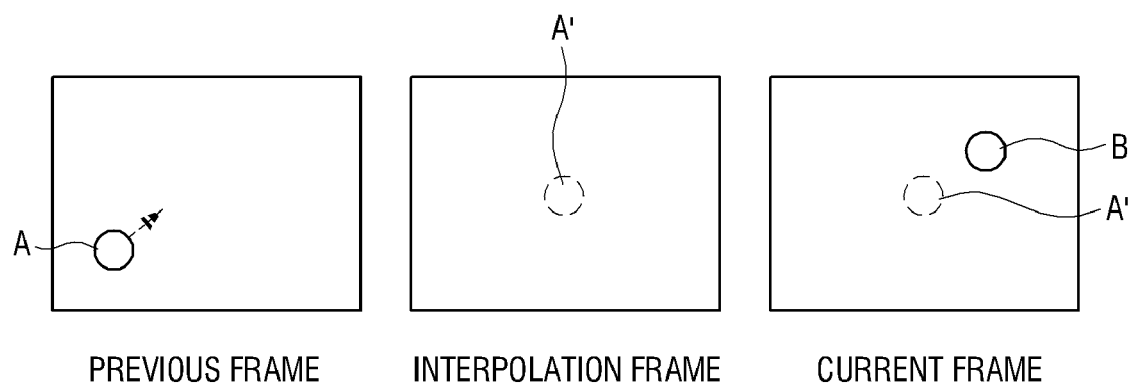
FIGS. 4A and 4B are drawings illustrating a process of converting the frame rate using an image signal processing apparatus according to an exemplary embodiment of the present invention.
Figure 4B:
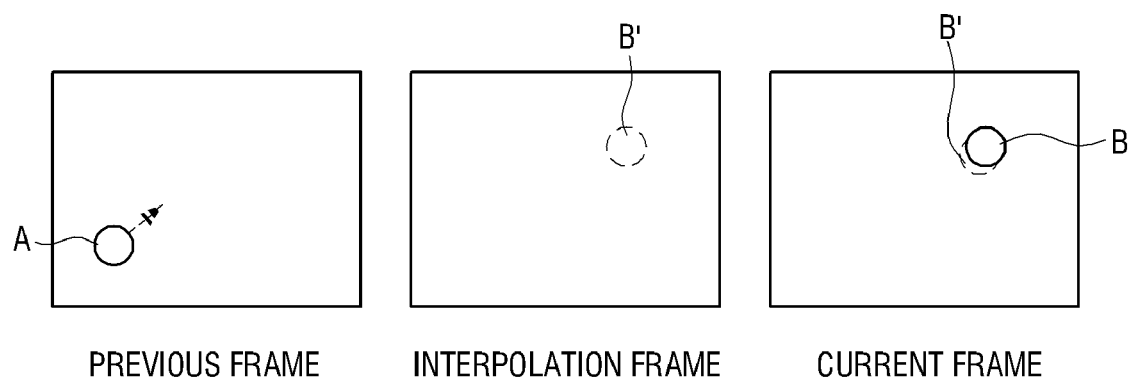

FIGS. 4A and 4B are drawings illustrating a process of converting the frame rate using an image signal processing apparatus according to an exemplary embodiment of the present invention.

In FIG. 4A, A in a previous frame is displayed in a current frame as B and displayed in an interpolation frame as A'. That is, if a changed area output by the changed area extraction unit 104 is smaller than a preset reference area, and if a representative value output by the representative value calculation unit 106 is smaller than a preset reference representative value, the comparison unit 110 outputs the third factor. Accordingly, if the comparison unit 110 outputs the third factor, the control unit 120 controls the interpolation frame generation unit 130 to maintain the phase of the interpolation frame at 0.5 as it is.

In FIG. 4B, A in a previous frame is displayed in a current frame as B and displayed in an interpolation frame as B'. That is, if a changed area output by the changed area extraction unit 104 is larger than the preset reference area, or if a representative value output by the representative value calculation unit 106 is larger than the preset reference representative value, the comparison unit 110 outputs the first factor or the second factor. Accordingly, referring to the first factor or the second factor output from the comparison unit 110, the control unit 120 controls the interpolation frame generation unit 130 to make the phase of the interpolation frame closer to 0 or 1.

As a result of analyzing the motion characteristics of an input image and comparing them with preset reference values, if the input image is an image having a low rate of halo artifacts, the frame rate is converted to maintain the linearity as illustrated in FIG. 4A. That is, if the comparison unit 110 outputs the third factor, the phase of the interpolation frame does not change. However, as a result of analyzing the motion characteristics of an input image and comparing them with preset reference values, if the input image is an image having a high rate of halo artifacts, the frame rate is converted not to maintain the linearity as illustrated in FIG. 4B. That is, if the comparison unit 110 outputs the first factor or the second factor, the phase of the interpolation frame changes to be closer to the previous frame or to the current frame. Whether to change the phase of the interpolation frame to be closer to 0 or 1 depends on the settings of the user.

Figure 5:
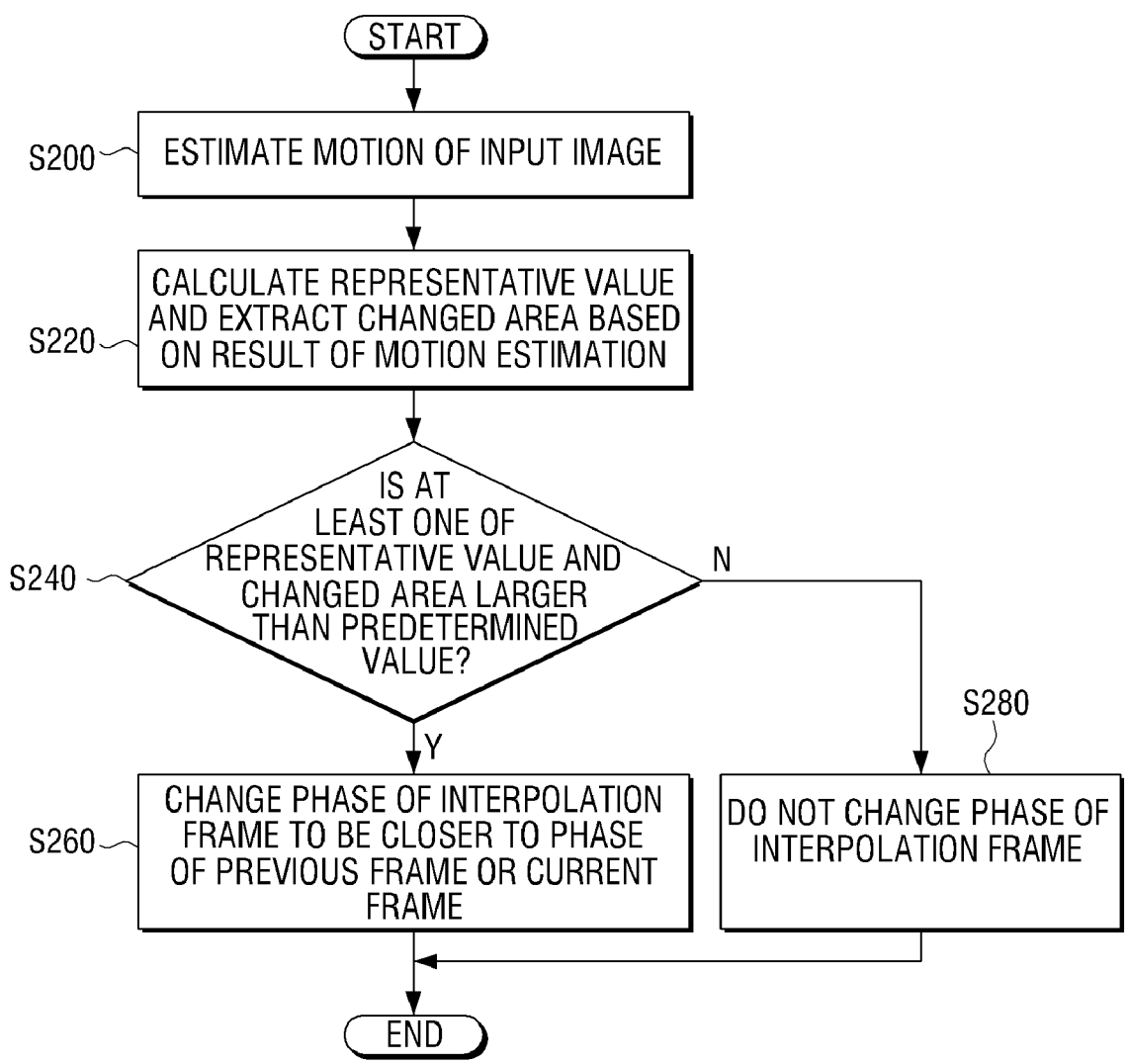
FIG. 5 is a flowchart illustrating an image signal processing method of an image signal processing apparatus according to an exemplary embodiment of the present invention.

FIG. 5 is a flowchart illustrating an image signal processing method of an image signal processing apparatus according to an exemplary embodiment of the present invention.

Referring to FIG. 5, the motion estimation unit 102 estimates motion of an input image (S200). Based on the results of the motion estimation, the representative value calculation unit 106 calculates a representative value and the changed area extraction unit 104 extracts a changed area (S220). Subsequently, the comparison unit 110 determines whether or not at least one of the representative value and the changed area is larger than predetermined values (S240). If at least one of the representative value and the changed area is larger than the predetermined values (S240-Y), the control unit 120 changes the phase of an interpolation frame to be closer to the phase of a previous frame or a current frame (S260). Alternatively, if both the representative value and the changed area are smaller than the predetermined values (S240-N), the control unit 120 does not change the phase of the interpolation frame (S280).

Along the above process, generation of diverse noise can be prevented by changing the phase of the interpolation frame according to the motion characteristics of the input image when converting the frame rate.

As described above, according to the exemplary embodiments of the present invention, an image signal processing apparatus to convert a frame rate by changing the phase of an interpolation frame according to the motion characteristics of an input unit so as not to generate halo artifacts, and an image signal processing method thereof are provided.

The foregoing exemplary embodiments are merely exemplary and are not to be construed as limiting the present invention. The present teaching can be readily applied to other types of apparatuses. Also, the description of exemplary embodiments of the present invention is intended to be illustrative, and not to limit the scope of the claims, and many alternatives, modifications, and variations will be apparent to those skilled in the art.

What is claimed is:

1. An image signal processing apparatus, comprising:
an input image analysis unit which estimates motion of an input image and outputs motion characteristics;
a comparison unit which compares the motion characteristics with reference values;
a control unit which changes a phase of an interpolation frame according to a comparison result of the comparison unit, and
an interpolation frame generation unit which generates the interpolation frame according to the control of the control unit,
wherein the reference values are preset reference values,
wherein the comparison unit compares one of the representative value and the changed area with a respective one of the reference values and outputs the comparison result as a factor to adjust the phase of the interpolation frame, and
wherein the control unit controls the phase of the interpolation frame to change between a phase of the previous frame and a phase of the current frame, according to the factor output by the comparison unit.

2. The image signal processing apparatus of claim 1, wherein the
input image analysis unit comprises:
a motion estimation unit which estimates motion between a previous frame and a current frame included in the input image, and outputs motion vectors;

a representative value calculation unit which calculates a motion vector making up a largest portion of the motion vectors outputted by the motion estimation unit, as a representative value; and a changed area extraction unit which extracts a changed area between the previous frame and the current frame based on the motion estimated by the motion estimation unit.

3. The image signal processing apparatus of claim 2, wherein the control unit changes the phase of the interpolation frame to be closer to a phase of one of the previous frame and the current frame, if the comparison result of the comparison unit comprises a determination of one of the representative value and the changed area being larger than a respective one of the reference values.

4. The image signal processing apparatus of claim 2, wherein the control unit does not change the phase of the interpolation frame, if the comparison result of the comparison unit comprises a determination of the representative value and the changed area being smaller than respective ones of the reference values.

5. The image signal processing apparatus of claim 2, wherein the changed area extraction unit extracts a covered area, which is displayed in the previous frame but is not displayed in the current frame, and an uncovered area, which is not displayed in the previous frame but is displayed in the current frame, as the changed area.

6. An image signal processing method, comprising:
estimating motion of an input image and outputting motion characteristics;
comparing the motion characteristics with reference values;
changing a phase of an interpolation frame according to a result of comparison by the comparison unit, and
generating the interpolation frame,
wherein the reference values are preset reference values,
wherein in the comparing the motion characteristics with the reference values, a result of comparing one of the representative value and the changed area with a respective one of the reference values is output as a factor to adjust the phase of the interpolation frame,
wherein in the changing the phase of the interpolation frame, the phase of the interpolation frame is controlled to change between a phase of the previous frame and a phase of the current frame, according to the output factor.

7. The image signal processing method of claim 6, wherein the outputting
the motion characteristics comprises: estimating motion between a previous frame and a current frame included in the input image, and outputting motion vectors;
calculating a motion vector making up a largest portion of the outputted motion vectors, as a representative value; and
extracting a changed area between the previous frame and the current frame based on the estimated motion.

8. The image signal processing method of claim 7, wherein in the changing the phase of the interpolation frame, the phase of the interpolation frame is changed to be closer to a phase of one of the previous frame and the current frame, if the result of comparison comprises a determination of one of the representative value and the changed area being larger than a respective one of the reference values.

9. The image signal processing method of claim 7, wherein in the changing the phase of the interpolation frame, the phase of the interpolation frame does not change, if the result of comparison comprises a determination of the representative value and the changed area being smaller than respective ones of the reference values.

10. The image signal processing method of claim 7, wherein in the extracting the changed area, a covered area, which is displayed in the previous frame but is not displayed in the current frame, and an uncovered area, which is not displayed in the previous frame but is displayed in the current frame, are extracted as the changed area.

11. An image signal processing method, comprising:
receiving an input image having a previous frame and a current frame;
estimating a motion between the previous frame and the current frame; and
generating an interpolation frame between the previous frame and the current frame,
wherein the interpolation frame is generated based on the estimated motion, and a phase of the interpolation frame is controlled based on a result of comparison between motion characteristics of the estimated motion and reference values,
wherein the reference values are preset reference values,
wherein the phase of the interpolation frame is controlled to be adjusted closer to a phase of one of the previous frame and the current frame, if the result of comparison comprises a determination that a changed area between the previous frame and the current frame is larger than a reference change area value of the reference values.

12. The image signal processing method of claim 11, wherein the phase of the interpolation frame is controlled to be adjusted closer to a phase of one of the previous frame and the current frame, if the result of comparison comprises a determination that a motion vector based on the estimated motion between the previous frame and the current frame, the motion vector representing an area occupying a largest portion of the frames of the input image, is larger than a reference motion vector value of the reference values.

13. The image signal processing method of claim 11, wherein the phase of the interpolation frame is controlled to be set as a linear average between a phase of the previous frame and a phase of the current frame, if the result of comparison comprises a determination that both a changed area between the previous frame and the current frame is smaller than a reference change area of the reference values, and a motion vector based on the estimated motion between the previous frame and the current frame, the motion vector representing an area occupying a largest portion of the frames of the input image, is larger than a reference motion vector value of the reference values.

14. The image signal processing apparatus according to claim 1, wherein the input image analysis unit comprises a motion estimation unit which estimates motion between a previous field and a current field included in the input image.

* * * * *